United States Patent
Kiehnle et al.

[11] Patent Number: 5,821,663
[45] Date of Patent: Oct. 13, 1998

[54] POWER SUPPLY CONFIGURATION FOR AN ELECTRIC MOTOR WITH FOUR BRUSHES

[75] Inventors: Gunther Kiehnle, Eppingen; Bernd Walther, Bietigheim-Bissingen, both of Germany

[73] Assignee: ITT Automotive Europe GmbH, Frankfurt am Main, Germany

[21] Appl. No.: 727,522

[22] PCT Filed: Apr. 11, 1995

[86] PCT No.: PCT/EP95/01328

§ 371 Date: Feb. 24, 1997

§ 102(e) Date: Feb. 24, 1997

[87] PCT Pub. No.: WO95/28029

PCT Pub. Date: Oct. 19, 1995

[30] Foreign Application Priority Data

Apr. 11, 1994 [DE] Germany .................. 44 12 319.1

[51] Int. Cl.$^6$ .................. H01R 39/36; H02K 13/00
[52] U.S. Cl. .................. 310/249; 310/50; 310/68 R; 310/71; 310/239; 310/240; 310/241; 310/242
[58] Field of Search .................. 310/50, 68 R, 310/71, 239, 240, 241, 242, 249

[56] References Cited

U.S. PATENT DOCUMENTS

| | | | |
|---|---|---|---|
| 4,673,837 | 6/1987 | Gingerich et al. | 310/239 |
| 4,746,829 | 5/1988 | Strobl | 310/239 |
| 4,845,396 | 7/1989 | Huber | 310/239 |
| 4,896,067 | 1/1990 | Walther | 310/239 |
| 4,926,075 | 5/1990 | Fushiya et al. | 310/50 |
| 4,978,876 | 12/1990 | Koster | 310/239 |
| 4,983,872 | 1/1991 | Strobl | 310/239 |
| 5,138,212 | 8/1992 | Wong et al. | 310/239 |
| 5,196,747 | 3/1993 | Kress et al. | 310/89 |
| 5,280,210 | 1/1994 | Kress et al. | 310/158 |

*Primary Examiner*—Steven L. Stephan
*Assistant Examiner*—Elvin G. Enad
*Attorney, Agent, or Firm*—Plevy & Associates

[57] ABSTRACT

Power supply is accomplished via two rails, which are arranged in one plane and which in each case have lugs, which can be bent out from the rail plane. In this case, contact arm of at least one lug is run away over a rail. In this way, a system which is quick to install and which, moveover, is quickly extended in the axial direction is produced.

20 Claims, 1 Drawing Sheet

POWER SUPPLY CONFIGURATION FOR AN ELECTRIC MOTOR WITH FOUR BRUSHES

FIELD OF THE INVENTION

The invention relates to a power supply configuration for an electric motor with four brushes.

BACKGROUND OF THE INVENTION

Frequently, mainly in the case of direct-current motors that operate at high current strengths, the collector is wired with four carbons, of which in each case two are connected in parallel. Only such a configuration ensures good operating reliability.

To be able to contact the four brushes, EP 0 291 765 B1 proposes providing two conductor rails that have been punched out of sheet metal and contacting two brushes at a time with a conductor rail.

In addition, it is proposed that, in each case, a conductor rail and the corresponding brushes be arranged on, in each case, one support plate and then that the two partial support plates be plugged together, in such a way that the brushes and the corresponding conductor rails are arranged in two different planes. It is readily evident that this leads to a greater axial overall length of the electric motor.

DE-OS 39 36 672 specifically proposes arranging all four brushes on a support plate in one plane but does not call for allowing the power to be supplied via punched-out conductor rails, but rather via flexible lines that are laid on the support plate. Here, the obvious disadvantage exists that the installation of the power supply is expensive since at least four lines must first be cut to length and their insulation stripped and then they have to be placed on the support plate in corresponding holding loops.

The invention is therefore based on the object of developing a system that consists of four brushes and especially the corresponding power supply. The system is supposed to extend quickly in the axial direction and be easy to install.

SUMMARY OF THE INVENTION

In order to accomplish the above object, it is proposed that a power supply configuration be designed in such a way that two conductor rails are provided, whereby each conductor rail is contacted by two brushes each. The conductor rails are arranged in one plane, whereby a contact lug is molded over a bend in at least one conductor rail, in such a way that the lug can be bent up from the plane of the conductor rail. In addition, the lug (bridge lug) is shaped in such a way that after being bent up, one arm of the lug extends away over the other conductor rail.

The stranded conductor of the corresponding brush can now be fastened to this arm in a conducting manner, without the danger existing that the stranded conductor will contact the other conductor rail.

In addition, it is proposed that additional lugs that can also be bent out from the conductor rail plane be molded onto the conductor rails.

This has the advantage that the stranded conductors of the brushes are run out from the conductor rail plane in such a way that no additional insulation of the stranded conductors is needed to avoid short circuits.

In each case, the conductor rails form semicircles that are connected to one another via contact bridges and thus form closed circles. After the rails are fastened to the brush holder plate, the contact bridges are penetrated, in such a way that the two rails are electrically insulated from one another.

The rails are punched out from sheet metal together with the contact lugs, whereby in the punched-out mold, the bridge lug points outward, while the three other lugs point inward. This ensures economical use of materials.

After the conductor rails and the brush holder are installed on a support plate, the brush holders are all located within the circle that is formed by the two conductor rails.

BRIEF DESCRIPTION OF THE DRAWINGS

The invention is to be explained in more detail below based on an embodiment, depicted in two figures where.

DETAIL DESCRIPTION OF THE INVENTION

Figure 1:
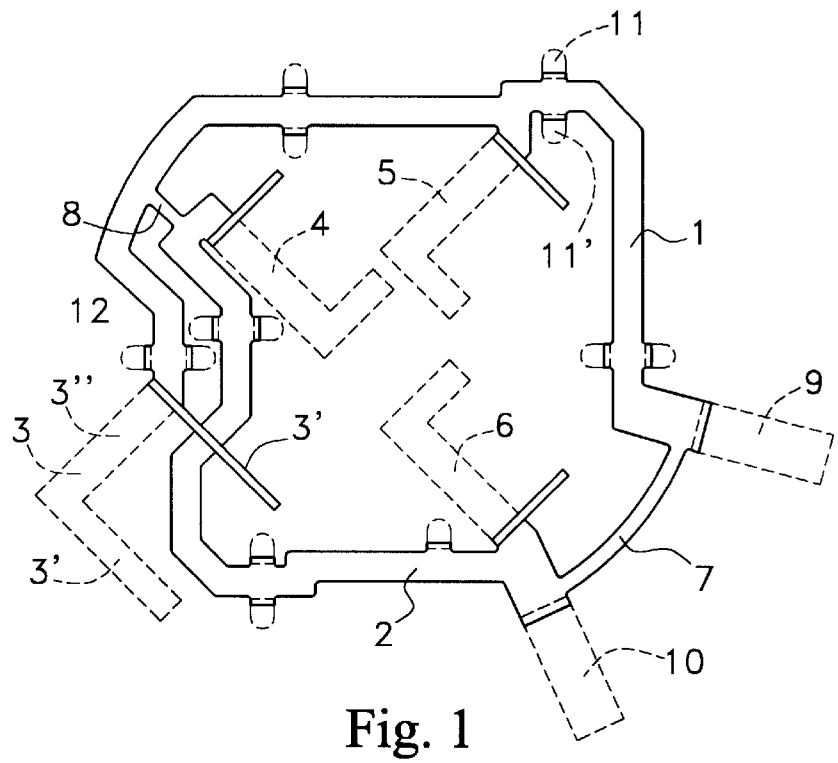
FIG. 1 shows the conductor rail system that is punched-out from sheet metal.

The power supply system consists of a first rail 1 and a second rail 2. Both rails form approximately a semicircle and together form a full circle.

At two points, contact bridges 7 and 8 are provided between the rails, which are interrupted after the rails are mounted on the support plate. Two lugs 3, 4 or 5, 6 are arranged on each rail.

The lugs are described based on bridge lug 3, but this description also applies in a corresponding way to additional lugs 4, 5, 6.

Each lug is L-shaped, whereby one leg forms contact arm 3' and the other leg forms upright arm 3". The end of upright arm 3", which does not merge into contact arm 3', is molded onto first rail 1 via a bend 12.

At bend 12, lug 3 can be bent out from the rail plane, in such a way that upright arm 3" is perpendicular to the rail plane and contact arm 3' extends parallel to the rail plane but above it.

In bridge lug 3 that is explained here, contact arm 3' extends over second rail 2. In this way, a brush that is inside the rail system can be connected in a conducting manner to contact arm 3' and thus to the first rail, without a conductive connection to the second rail being produced.

As already mentioned, additional lugs 4, 5, 6 are designed in a corresponding way, with the difference that after the lugs are bent up, the contact arms do not reach away over a rail.

To ensure advantageous use of the punching material, upright arm 3" of bridge lug 3 points outward in the punching plane, while additional arms 4, 5, 6 point inward.

In addition, each conductor rail has a power supply strap 9 or 10 that points outward and, viewed in the image plane, can be bent downward.

To fasten the rails, several fastening straps 11, 11' are provided, which are first bent downward and can be inserted into corresponding holes in the support plate. There, they are bent again by 90°, in such a way that the rails are held more securely on the support plate.

As already mentioned, the rails, the contact brushes, the lugs, as well as the power supply straps and the fastening straps are punched out of sheet metal; the punching mold of the parts that can be bent is indicated by broken lines.

Figure 2:
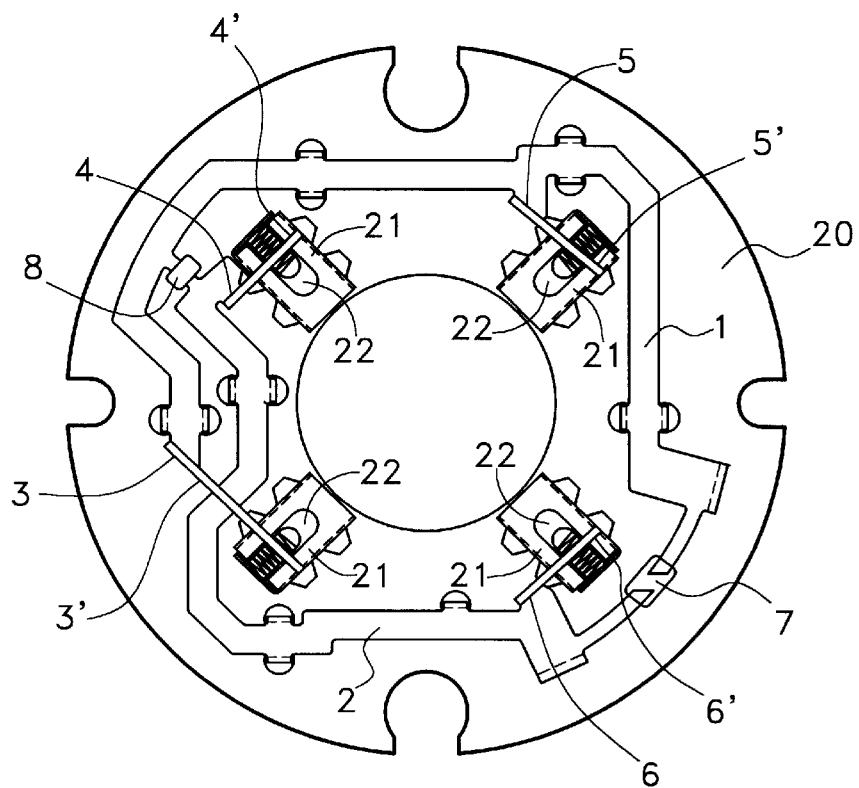
FIG. 2 shows the top view of a support plate with the power supply system and the brush holders that are depicted in FIG. 1.

A support plate 20 is shown in FIG. 2. The latter is interrupted in the middle. The central break is used to accommodate the collector.

Four brush holders 21, which each house a brush 22, are arranged around the collector. Rails 1, 2 according to FIG. 1 are arranged around brush holder 21. Contact bridges 7 and 8 are interrupted. Contact arms 3', 4', 5' and 6' of bent lugs 3, 4, 5, 6 are located above the brushes that correspond to them in each case. Stated more precisely, the contact arms are located above the radial outer ends of the brush holder, in such a way that the brush stranded conductors that project outward there need to be run upward only from the support plate plane to be able to be connected in a conducting manner to the contact arms. The connection can be made by welding or soldering. It is shown that in each case two diametrically opposite brushes contact one rail apiece.

It will be understood that the embodiment described herein is merely exemplary and that a person skilled in the art may make many variations and modifications to the described embodiment utilizing functionally equivalent elements to those described. Any variations or modifications to the invention described hereinabove are intended to be included within the scope of the invention as defined by the appended claims.

What is claimed is:

1. In a power supply configuration for an electric motor including four brushes and two conductor rails, each of the two conductor rails being contacted by two of the brushes, the improvement therewith comprising:

a support plate, the conductors rails arranged in one plane on the support plate so as to form a circle; and a brush holder for each of the four brushes, the brush holders being arranged on the support plate within the circle formed by the conductor rails;

wherein at least one of the two conductor rails includes a first contact lug having one arm molded above a bend so that the lug is adapted to be bent from the plane of the conductor rail, and so that after being bent up, the one arm of the lug extends away over the other one of the two conductor rails.

2. The power supply configuration according to claim 1, further comprising second, third and fourth contact lugs, each of said second, third and fourth contact lugs molded onto one of said two conductor rails, so that said second, third and fourth contact lugs can be bent out from said plane of said two conductor rails.

3. The power supply configuration according to claim 1, wherein each one of said two conductor rails defines a semi-circle shape and said two conductor rails are connected to one another by contact bridges so that said connected two conductor rails define a closed-circle shaped, and wherein said contact bridges are penetrated after said two conductors rails are fastened to a brush holder plate.

4. The power supply configuration according to claim 2, wherein each one of said first, second, third, and fourth contact lugs are L-shaped.

5. The power supply configuration according to claim 2, wherein said two conductor rails and said first, second, third, and fourth lugs are punched out of sheet metal, and wherein one of said first, second, third, and fourth lugs points outward with respect to said circle formed by said conductor rails, and remaining ones of said first, second, third, and fourth lugs point inward with respect to said circle formed by said conductor rails.

6. A power supply configuration for an electric motor with four brushes, comprising:

a first conductor rail for contact with two of the four brushes of the electric motor;

a second conductor rail for contact with the remaining two of the four brushes, wherein said first and second conductor rails are arranged in a single plane; and a first contact lug having an arm, said first contact lug molded onto said first conductor rail and bent out from said plane, so said arm of said first conductor lug extends away over said second conductor rail.

7. The power supply configuration according to claim 6, further comprising second, third and fourth contact lugs, each of said second, third and fourth contact lugs molded onto one of said first and second conductor rails, said second, third and fourth contact lugs bent out from said plane.

8. The power supply configuration according to claim 7, wherein each one of said first, second, third, and fourth contact lugs are L-shaped.

9. The power supply configuration according to claim 7, wherein said power supply configuration is punched out of sheet metal.

10. The power supply configuration according to claim 7, wherein one of said first, second, third, and fourth lugs point outward with respect to a center formed by said conductor rails, and remaining ones of said first, second, third, and fourth lugs point inward with respect to a center formed by said conductor rails.

11. The power supply configuration according to claim 6, wherein said first and second conductor rails are connected to one another by contact bridges.

12. The power supply configuration according to claim 11, wherein each one of said first and second conductor rails has a semi-circular shape.

13. The power supply configuration according to claim 12, wherein said connected first and second conductor rails has a closed-circular shape.

14. The power supply configuration according to claim 11, wherein said contact bridges are penetrated after said two conductors rails are fastened to a brush holder plate of the electric motor.

15. A power supply configuration for an electric motor with four brushes, comprising:

a first conductor rail for contact with two of the four brushes of the electric motor;

a second conductor rail for contact with the remaining two of the four brushes, wherein said first and second conductor rails are arranged in a single plane; and a first contact lug having an arm, said first contact lug coupled to said first conductor rail, said first conductor lug extending over said second conductor rail.

16. The power supply configuration according to claim 15, further comprising second, third and fourth contact lugs, each of said second, third and fourth contact lugs coupled to one of said first and second conductor rails, said second, third and fourth contact lugs, wherein one of said first, second, third, and fourth lugs points outward with respect to a center formed by said conductor rails, and remaining ones of said first, second, third, and fourth lugs point inward with respect to a center formed by said conductor rails.

17. The power supply configuration according to claim 16, wherein each one of said first, second, third, and fourth contact lugs are L-shaped.

18. The power supply configuration according to claim 15, wherein said first and second conductor rails are connected to one another by contact bridges.

19. The power supply configuration according to claim 15, wherein each one of said first and second conductor rails has a semi-circular shape.

20. The power supply configuration according to claim 15, wherein said connected first and second conductor rails has a closed-circular shape.

* * * * *